Patented Aug. 30, 1949

2,480,723

UNITED STATES PATENT OFFICE 2,480,723

SOLDER-FLUX MIXTURE

Raymond J. Evans, Bensonville, and Francis L. Kurek, Chicago, Ill., assignors to Continental Can Company, Inc., New York, N. Y., a corporation of New York No Drawing. Application October 29, 1947, Serial No. 782,944

19 Claims. (Cl. 148—24)

This invention as more particularly set out in the following specification, is concerned with a composition including flux and solder particles which can be employed upon surfaces which it is intended shall be solder bonded.

In known compositions of this type, difficulty has been encountered in providing a composition capable of maintaining the solder particles in permanent suspension of convenient application to the metal surface, and having adequate and sufficient stability and adherence to remain in place on this surface until the soldering heat is applied, and which upon heating releases the molten bonding metal in condition for forming tight and strong bonds.

One of the features of the instant invention is the preparation of such a composition by employment of particles of solder in the form of a powder protected from oxidation, and suspended in a fluxing emulsion including a volatile vehicle which can be easily expelled after applying the solder-flux coating upon the metal.

Another feature of the invention is the provision of a composition in which particles of solder are held in permanent suspension in a fluxing emulsion in which the continuous phase is water, and in which the flux is distributed with essential uniformity in close association with the individual solder particles.

A further feature is the provision of a solder-flux mixture as a stable suspension in an aqueous soap emulsion having a consistency like mayonnaise at room temperature, and responding to heat by losing both the dispersing water and the volatile soap alkali and then acting upon fusion of the acid component of the soap to effect adhesion of a solder-flux film upon the surface to be bonded, with the solder particles under the continued protection of the flux surrounding them.

In an illustrative practice of this invention, 10 parts by weight of hydrogenated rosin are heated with two parts of light mineral oil to about 200° F., and this heated mixture is then added to a solution prepared from 78 parts of water and 10 parts of 28% ammonium hydroxide solution, with constant stirring as the plasticized rosin is added. The product is a jelly-like emulsion, having substantially the consistency of mayonnaise. To this was added 200 parts by weight of pulverized low-oxide solder (100 mesh and finer) with thorough stirring to distribute the solder particles throughout the mass. This composition has enough fluidity to be easily poured and any disturbance of the surface quickly flows out.

The hydrogenated rosin has an acid number between 155 and 165, a degree of saturation of 50% or higher and a melting point of 165 to 175° F. An example of this is Staybelite.

The mineral oil is a paraffin oil having a specific gravity of 0.840 to 0.940 obtained from petroleum by distillation between 330° and 390° C. after removal of the lighter constituents.

By low-oxide solder we refer to one which in its production normally has less than one percent of oxides of tin and lead. In the example given it is 30% tin and 70% lead. By suitable manufacturing procedure the amount of oxides of these metals is limited to approximately one-half percent. The greater the ratio of tin present, the less likelihood there is of this oxidation occurring. When the solder is reduced to less than 100 mesh the superficial area is correspondingly greatly increased. Standing with exposure to the air increases the oxide greatly so that best results are obtained when the powdered solder is freshly prepared or has been protected against superficial oxidation.

The fine grain (100 mesh) is desirable to prevent the solder particles from settling out and to obtain a smooth dried film of greater compactness. Hence greater comminution (up to 400 mesh) is advantageous subject only to the greater care that must be exercised to prevent the oxidation of the relatively larger superficial area.

The fineness of division of the particles of solder, and the gel strength of the flux emulsion, lead to a material which can be stored indefinitely without settling or separation, when confined to avoid loss of ammonia. This solder-flux composition can be applied with a die liner roller or spray jet to metal surfaces, such as can ends of tin plate, and these ends then passed through an oven at a temperature of 180 to 250° F. for evaporating the water and free ammonia and fusing the plasticized rosin; whereupon the stable components (rosin, plasticizer, and solder) are caused to form an adherent non-brittle coating upon the metal surface, and then serve to protect this surface and the solder particles against air-oxidation. During the mixing of the plasticized rosin into the ammonia solution, a saponification occurs with the formation of an emulsion, with a part of the ammonia operating as an alkalizing agent for assuring continuity of dispersion. During the drying operation, this dissolved ammonia is normally given off and the water is evaporated so that the dried coating is essentially free of water and ammonia, even the latter forming the rosin soap being fugitive, leaving only the plasticized rosin and solder.

Such a can end, with the coating compound thereon, can then be brought into contact with the other metal surface with which it is to be bonded, as by double seaming the end on a tinned can body. The plasticized rosin maintains adherence satisfactorily regardless of bending. The two metal portions, with the solder-flux coating therebetween, are then heated for example by an open flame, or hot tool, so that the flux is liquified: due to the close approximation of the metal surfaces, the flux remains in situ. Further heating then melts the solder while the flux operates upon the metal surfaces in the usual way to maintain or prepare them for receiving the molten solder. In practice, it is found that the composition permits the forming of such solder bonds by employment of only about one-half the amount of solder that is required when separate fluxing and solder applications are employed. Also a neater appearing seam is obtained because there is practically no excess solder on the outside of the seam.

Where the metal is not to be bent sharply after being coated with the composition, and before solder-bonding and with the roller application, for example, the plasticizer may be omitted; and a mixture of 10 parts rosin, 10 parts 28 percent ammonia solution and 80 parts water can be employed to suspend 200 parts of pulverized solder. Upon drying to expel water and ammonia, and heating to fusion of the rosin, the coating adheres well to the undisturbed metal.

In one specific practice, the pulverized solder was formed of 30% tin and 70% lead, containing less than ½ of 1% of lead oxide and tin oxide measured as oxygen. This product was found to remain essentially stable as a suspension; and samples nine months old still show the solder in suspension, with no deterioration in the compound. Other tin-lead solders, such as 50—50, can be used; provided that the total oxide content is not excessive.

The powdered solder composition may be of any usual type with which fluxes of rosin type are satisfactory. Such compositions may be solders of silver and lead; tin, lead and antimony; tin, lead and silver; cadmium and lead and similar combinations in varying ratios.

It has been found preferable to have the solder particles not over 50 mesh in size; and particles as small as 400 mesh or below have been found to provide a satisfactory material. An economical practice is to employ a mixture of all sizes up to 100 mesh.

Various types of hydrogenated rosin may be employed under the above formulation. Equivalent compounds are other fluxing rosins, preferably those which have been treated to attain greater stability, and which will produce gels with ammonia that are not as stringy or slippery as those given by the usual gum rosin. When, however, the stringiness or slipperiness is not objectionable, as for example in nozzle application, ordinary gum rosins can be utilized. Among the other substitutes for hydrogenated rosin are (a) polymerized rosin (melting point 213° F.; specific gravity 1.072; acid number 150); (b) glycerol-maleic anhydride-rosin condensate (alcohol soluble, acid number above 200, and high melting point); (c) partially polymerized rosin (melting point 214° F.; acid number 160); (d) maleic acid-rosin condensate (melting point 135° F.; acid number 300; specific gravity 1.14); and in general rosins of natural origin and treated rosin can be employed which have an acid number above about 100 and form a water gel upon saponification with ammonia solution.

The ammonium hydroxide solution acts to saponify the rosin acids and form therewith a compound which provides a water gel. In practice, with commercial hydrogenated rosin, about 3.5 parts by weight of 28% ammonia solution saponifies 10 parts of the rosin: and excess is provided to compensate losses and to maintain alkalinity of the aqueous gel prior to application. When ammonia is lost from the aqueous gel, the rosin-ammonia soap breaks down and it becomes white and thin.

As a substitute alkaline ingredient in place of ammonia, other amines may be used. Good solubility in water, gel structure and solder-suspending property have been obtained in the illustrative example given above, with similar proportions of ethylamine, ethylene diamine, monoethanol amine and morpholine. The results are not so good with triethyl amine and triethanol amine suggesting that success in gel formation requires an hydrogen atom being present in attachment to the nitrogen atom.

The mineral oil employed in the above formulation is illustrative of a material operative as a plasticizer to avoid brittleness of the rosin when the coating composition has been deposited and dried upon the metal. The commercially available "White Rose" mineral oil has been found satisfactory. Other mineral oils which are soluble in rosin can be employed, with preference for the so-called light mineral oils free of unsaturated compounds. Among other plasticizers which have been found useful are dibutyl phthalate, dimethyl phthalate, butyl phthalate butyl glycollate, methyl phthalate ethyl glycollate, and in general the high boiling phthalate and glycollate esters which are intersoluble with the rosin. Such plasticizers have the characteristics of being intersoluble with the rosin, of having boiling points well above 250° F., and low vapor tensions at the drying temperature. They serve primarily to improve the mechanical properties of the rosin in forming an adhesive, non-brittle film on the plate.

The quantity of water employed is determined by the consistency desirable for the coating operation on the one hand, and by the capability of providing a satisfactory consistency to maintain the solder powder in suspension on the other hand. The rosin has been found useful in proportions of 8 to 15% of the total suspending medium. In the above example, about 10% is utilized.

The ratio of solder powder to the rosin is preferably from 50:1 downward, somewhat dependent upon particle size: with very small particles, a lesser proportion of solder to rosin is preferred: a satisfactory solder flow is accomplished; an economic limit is around 20:1 or 15:1, at which the flux residue is not excessive upon completion of the solder bond. In economical practice, the ratio of solder to flux and suspending material is around 2:1.

The ratio of plasticizer to rosin is usually between 1:10 and 3:10. In practice, a desirable plasticity is obtained at a 2:10 ratio.

The specific examples of practice given, therefore, are not restrictive: and compositions may be made of the materials and at the stated proportions, within the scope of the invention as set out by the appended claims.

Having thus described our invention, what we claim as new and useful is:

1. A fluxing composition consisting of a rosin soap and a volatile alkali selected from the group consisting of ammonia, ethylamine, monoethanol amine, ethylene diamine and morpholine, dispersed in water as a gel and having particles of solder uniformly suspended therein.

2. A fluxing composition consisting of rosin saponified by a volatile alkali selected from the group consisting of ammonia, ethylamine, monoethanol amine, ethylene diamine and morpholine, dispersed in water as a gel and having particles of solder uniformly suspended therein.

3. A fluxing composition consisting of hydrogenated rosin saponified by a volatile alkali selected from the group consisting of ammonia, ethylamine, monoethanol amine, ethylene diamine and morpholine, dispersed in water as a gel and having particles of solder uniformly suspended therein and protected from oxidation by said gel.

4. A fluxing composition consisting of hydrogenated rosin saponified by a water solution of ammonia as a gel and having therein uniformly suspended particles of solder protected from oxidation by said gel.

5. A fluxing composition consisting of hydrogenated rosin, a small proportion of a rosin plasticizer, emulsified in aqua ammonia to form a gel and having therein uniformly suspended particles of solder protected from oxidation by said gel.

6. A fluxing composition consisting of hydrogenated rosin, a small proportion of a rosin plasticizer, emulsified in aqua ammonia to form a gel and having therein uniformly suspended particles of solder of a particle size not exceeding 100 mesh protected from oxidation by said gel.

7. A fluxing composition consisting of hydrogenated rosin, a small proportion of a rosin plasticizer, emulsified in aqua ammonia to form a gel and having therein uniformly suspended particles of solder of a particle size not exceeding 100 mesh and containing not more than one percent of metallic oxides.

8. A fluxing composition consisting of hydrogenated rosin, a small proportion of a rosin plasticizer, emulsified in aqua ammonia to form a gel and having therein uniformly suspended particles of 30/70 tin-lead solder.

9. A fluxing composition consisting of hydrogenated rosin, a small proportion of a rosin plasticizer, emulsified in aqua ammonia to form a gel and having therein uniformly suspended particles of 30/70 tin-lead solder of a particle size not exceeding 100 mesh.

10. A fluxing composition consisting of 10 parts by weight of hydrogenated rosin, 2 parts of a rosin plasticizer, 78 parts of water, 10 parts of concentrated aqua ammonia and 200 parts of powdered solder.

11. A composition as defined in claim 10 and in which the plasticizer is a light mineral oil.

12. A composition as defined in claim 10 and in which the powdered solder contains not exceeding one percent of the oxides of the metals in the solder.

13. A composition as defined in claim 10 and in which the powdered solder contains approximately 30% tin and 70% lead with not exceeding one percent of said metals in the form of oxides.

14. A fluxing composition consisting of hydrogenated rosin emulsified by ethylamine in water to form a gel and having therein uniformly suspended particles of solder protected from oxidation by said gel.

15. A fluxing composition consisting of hydrogenated rosin emulsified by monoethanolamine in water to form a gel and containing uniformly suspended particles of solder protected from oxidation by said gel.

16. A fluxing composition consisting of hydrogenated rosin emulsified by morpholine in water to form a gel and containing uniformly suspended particles of solder protected from oxidation by said gel.

17. A fluxing composition consisting of a condensation product of rosin having an acid number of at least 100, emulsified by aqua ammonia to form a gel and having therein uniformly suspended particles of finely powdered solder.

18. A fluxing composition consisting of 8 to 15 parts by weight of hydrogenated rosin having an acid number above 100; a rosin plasticizer in amount of 10 to 30 percent of the rosin; a solution of aqua ammonia in amount exceeding that required to saponify the rosin to form a gel in water and having therein finely powdered solder particles uniformly suspended in said gel.

19. A fluxing composition consisting of a polymerized rosin having an acid number of at least 100, emulsified by aqua ammonia to form a gel and having therein uniformly suspended particles of finely powdered solder.

RAYMOND J. EVANS.
FRANCIS L. KUREK.

REFERENCES CITED

The following references are of record in the file of this patent:

UNITED STATES PATENTS

| Number | Name | Date |
|---|---|---|
| 1,772,952 | Knoth | Aug. 12, 1930 |